United States Patent [19]

Kamagami

[11] Patent Number: 5,452,143
[45] Date of Patent: Sep. 19, 1995

[54] APPARATUS AND METHOD FOR READING BINARY DATA FROM A MAGNETIC STRIPE

[75] Inventor: Shinya Kamagami, Tokyo, Japan

[73] Assignee: Oki Electric Industry Co., Ltd., Tokyo, Japan

[21] Appl. No.: 183,228

[22] Filed: Jan. 19, 1994

[30] Foreign Application Priority Data

Jan. 20, 1993 [JP] Japan .................. 5-007857

[51] Int. Cl.⁶ .................. G11B 25/04; G11B 5/09
[52] U.S. Cl. .................. 360/2; 360/51; 360/53; 235/449
[58] Field of Search .................. 360/2, 51, 53, 60, 27, 360/43; 235/449, 436, 450, 440, 493, 384; 369/48; 341/51

[56] References Cited

U.S. PATENT DOCUMENTS

| | | | |
|---|---|---|---|
| 3,882,301 | 5/1975 | Nassimbene | 360/2 |
| 3,995,145 | 11/1976 | Harris, III | 235/450 |
| 4,578,720 | 3/1986 | Matsumoto | 360/51 |
| 4,678,897 | 7/1987 | Lewiner et al. | 235/436 |
| 5,285,328 | 2/1994 | Behr et al. | 360/2 X |
| 5,291,005 | 3/1994 | Ishii et al. | 235/449 |

FOREIGN PATENT DOCUMENTS

| | | |
|---|---|---|
| 54-65015 | 5/1979 | Japan . |
| 55-146623 | 11/1980 | Japan . |
| 59-98312 | 6/1984 | Japan . |
| 59-231712 | 12/1984 | Japan . |

Primary Examiner—Andrew L. Sniezek
Assistant Examiner—Patrick Wamsley
Attorney, Agent, or Firm—Steven M. Rabin

[57] ABSTRACT

A magnetic data reader and method for reading magnetic data from a stripe of passenger tickets while avoiding erroneous encoding of clock data which causes a read error. A CPU controls the counter value adder to acquire a reference time by summing up values of an interval time calculated from two or more bits of clock data and averaging the added value. If the binary data change within the clock data window and the corresponding interval time exceeds the permissible range of the prescribed reference time, the CPU restarts a demodulation operation by resetting a demodulator circuit.

17 Claims, 5 Drawing Sheets

(a) ANALOG WAVEFORM
(b) DIGITAL WAVEFORM
(c) BINARY DATA
(d) HEXADECIMAL DATA

APPARATUS AND METHOD FOR READING BINARY DATA FROM A MAGNETIC STRIPE

CROSS-REFERENCE TO RELATED APPLICATIONS

This application claims priority rights under 35 USC §119 of Japanese Patent Application No. Hei 5-007857, filed Jan. 20, 1993, the entire disclosure of which is incorporated herein by reference.

BACKGROUND OF THE INVENTION

1. Field of the Invention

The invention relates to a ticket issuing device for flight or other passenger tickets, each having a magnetic stripe therein, and to be more precise, relates to a reader for magnetic data and a method for reading the magnetic data on passenger tickets.

2. Description of the Related Art

For more efficient and better passenger service provided by airline or other transportation companies, passenger ticket issuing devices have recently been developed, each device being provided with a magnetic data reader which records various information into the magnetic stripes on the passenger tickets, reads data on the magnetic stripes, and performs various kinds of processing based on the data.

In a conventional way of reading magnetic data by using this type of device, data on the magnetic stripe of each passenger ticket are transferred to the fixed magnetic read head, an output from the magnetic read head is amplified to a required analog level, and then the amplified signals are converted to digital signals by a peak sense circuit.

Since the converted digital signals are constituted to have a frequency modulated form (hereinafter referred to as "FM"), they are further converted to binary data by demodulation of the signal. In the FM mode, data having a specified reference frequency F are converted to "0" whereas data having frequency 2F, that is double the reference frequency F, are converted to "1". The value of the reference frequency F is achieved by calculation of a pulse width length of the detected digital signal.

Various required data specific to a particular ticket, i.e. passenger data, in addition to clock data "0"s used for detecting each of the required data, and management data, are recorded in the magnetic stripe of each passenger ticket; the clock data contain a specific number of consecutive "0"s to detect the beginning of the required data. Accordingly, in the detection of data, clock data and start sentinel data, i.e. start bit data, which are defined among the management data stored in advance at a predetermined region of a memory, are compared with clock and start sentinel data read from the stripe, to detect the beginning of the required data. The magnetic data consist of a plurality of blocks, and the clock data and the start sentinel data are put at the beginning of each block. After the required data are detected, they are converted from binary to hexadecimal form of specified bit length and then finally converted to character data.

The reference frequency of magnetic data output from the data medium depends on its transmission speed. The binary data are achieved by calculation of the frequency of data which were acquired just before the data to be read because the frequency of binary "1" is twice as high that of binary "0" in the FM mode. Although it is thought that a predetermined fixed frequency is used, instead of the above, as the reference frequency, it may inherently reduce the accuracy of the calculation in the FM mode. The reference frequency is determined within a certain permissible range on the assumption that some fluctuation may occur in the transmission speed of the data medium. Excessive fluctuation of the transmission speed, however, hardly occurs within one-bit of data in the transmission mechanism. Accordingly, the reference frequency is achieved by calculation of the frequency of the one bit of data which was acquired just before the data to be read.

However, the above-described magnetic data reader has encountered the following problems:

Although the demodulation technique of the conventional magnetic data reader described above assumes that there is no excessive fluctuation of the transmission speed of the data medium, a peak shift may be generated in the output of the read data caused by a perforation on the passenger ticket, a flaw on a magnetic stripe made by a passenger while carrying the ticket, or an interfering noise from adjacent tracks if the magnetic read head is used for reading data from a plurality of tracks in a magnetic stripe. The peak shift may cause a pulse width of the digital signal (a period of time between two states of the digital signal) to be temporarily longer (lower frequency) and the next pulse width of the digital signal to be temporarily shorter (higher frequency) within the permissible range, even if the written data are the same as the previous data.

In the demodulation, this makes the pulse width of read data longer than the previous one within the permissible range in which a demodulation error is not detected. Therefore, the data am set to binary "0", and conversely the subsequent pulse width becomes shorter by as much as the previous extension and then the data are set to "1". This is because the pulse width of only just the previous one bit is used for calculation of a reference pulse width in the conventional demodulation technique. In addition, an erroneous encoding of data such that all subsequent data are set to "1" occurs, because the pulse width whose data were set to "1" is specified as the reference frequency.

If an excessive fluctuation of time (pulse width) is detected in the demodulation circuit, the demodulation circuit is reset to restart the demodulation because demodulation errors are considered to have occurred. However, the permissible range of the pulse width permits fluctuation to some extent, since some degree of fluctuation of the transmission speed of the data medium is assumed. This allows the pulse width of the digital signal to be longer or conversely shorter within the permissible range, which causes a read error based upon erroneous encoding of data, instead of a detected demodulation error, such that read data are set to "1" for written data "0" or conversely set to "0" for written data "1".

SUMMARY OF THE INVENTION

A principal object of the present invention is to provide a magnetic data reader and a method for reading magnetic data utilizing the reader, which avoids erroneous encoding of data from a magnetic stripe of passenger tickets.

Another object is to provide a magnetic data reader and a method for reading magnetic data utilizing the reader, which avoids the subsequent data being erroneously encoded if erroneous encoding of data is caused by interfering noise from adjacent tracks or the perforation on passenger tickets, without a demodulation error being detected while reading clock data.

In order to accomplish the above objects, a magnetic data reader according to the present invention employs a magnetic read head, a converter circuit, a calculation circuit, a demodulator, an adder and two control means.

The magnetic read head reads data from a magnetic stripe in which a same type of binary data are consecutively stored as clock data at either a head or a rear portion of a magnetic data format.

The converter circuit converts the clock data read from the stripe into a digital signal. The calculation circuit calculates intervals of time between successive interchange states of the digital signal. The demodulation circuit demodulates the digital signal into binary data. The adder sums a plurality of the calculated time intervals. The first control circuit controls the adder to acquire a prescribed reference time, and the second control circuit restarts a demodulation operation by resetting the demodulation circuit when the binary data changes within the clock data without a demodulation error being detected and an interval of time between two successive interchange states of the digital signal corresponding to the changed clock data exceeds a permissible range of the prescribed reference time.

In another aspect of the invention, the first control circuit sets as a prescribed reference time an interval of time calculated from the clock data ahead of changed clock data when the binary data change within the clock data, and controls the adder to acquire an added value by adding two intervals of time calculated respectively from the clock data in which the binary data changes and the succeeding clock data thereof.

In the further aspect of the invention, the first control circuit acquires the prescribed reference time by adding two or more intervals of time and averaging the added intervals of time.

In still further aspect of the invention, the first control circuit acquires the prescribed reference time by adding two or more intervals of time calculated from the clock data ahead of the read clock data and averaging these intervals of time.

There are also provided another type of the magnetic data reader which employs at least two comparing means and a control circuit instead of the adder and two control circuits described above.

Two comparing means detect an initiation of prescribed data processing by comparing the binary data converted by the demodulation circuit with prescribed comparison data and matching them. One comparing means contains comparison data identical to the binary data of the clock data, and the other comparator contains a comparison data opposite to the binary data of the clock data.

According to the invention, when binary data change within the clock data without a demodulation error being detected, a magnetic data reader acquires a reference time by summing up values of an interval of time between two states of the digital signal calculated from two or more bits of clock data and averaging the added values, and restarts a demodulation operation by resetting the demodulation circuit when an interval of time corresponding to the changed binary clock data exceeds a permissible range of the prescribed reference time.

In another aspect of the invention, when binary data change within the clock data without a demodulation error being detected, the magnetic data reader acquires a reference time by summing up values of an interval of time between two states of the digital signal, calculated from two or more bits of clock data just before the prescribed clock data in which binary data change and averaging the added values, and restarts a demodulation operation by resetting the demodulation circuit when an interval of time corresponding to the changed binary data exceeds the permissible range of the prescribed reference time.

According to another aspect of the invention, the magnetic data reader compares the binary data converted from clock data with the comparison data opposite to the binary data of preset clock data and restarts a demodulation operation by resetting the demodulation circuit when the compared data match.

According to still another aspect of the invention, when binary data changes within the clock data without a demodulation error being detected, the magnetic data reader acquires a reference time by counting an interval of time between two states of the digital signal corresponding to the clock data just before the changed clock data, sums up values of the time intervals calculated from the clock data in which binary data changes and the succeeding clock data, and restarts a demodulation operation by resetting the demodulation circuit when the added value exceeds the permissible range of the prescribed reference time.

BRIEF DESCRIPTION OF THE DRAWINGS

These and other features and advantages of the invention will be more clearly understood from the following detailed description of the preferred embodiments with reference to the accompanying drawings in which.

DETAILED DESCRIPTION OF THE PREFERRED EMBODIMENTS

Figure 1:
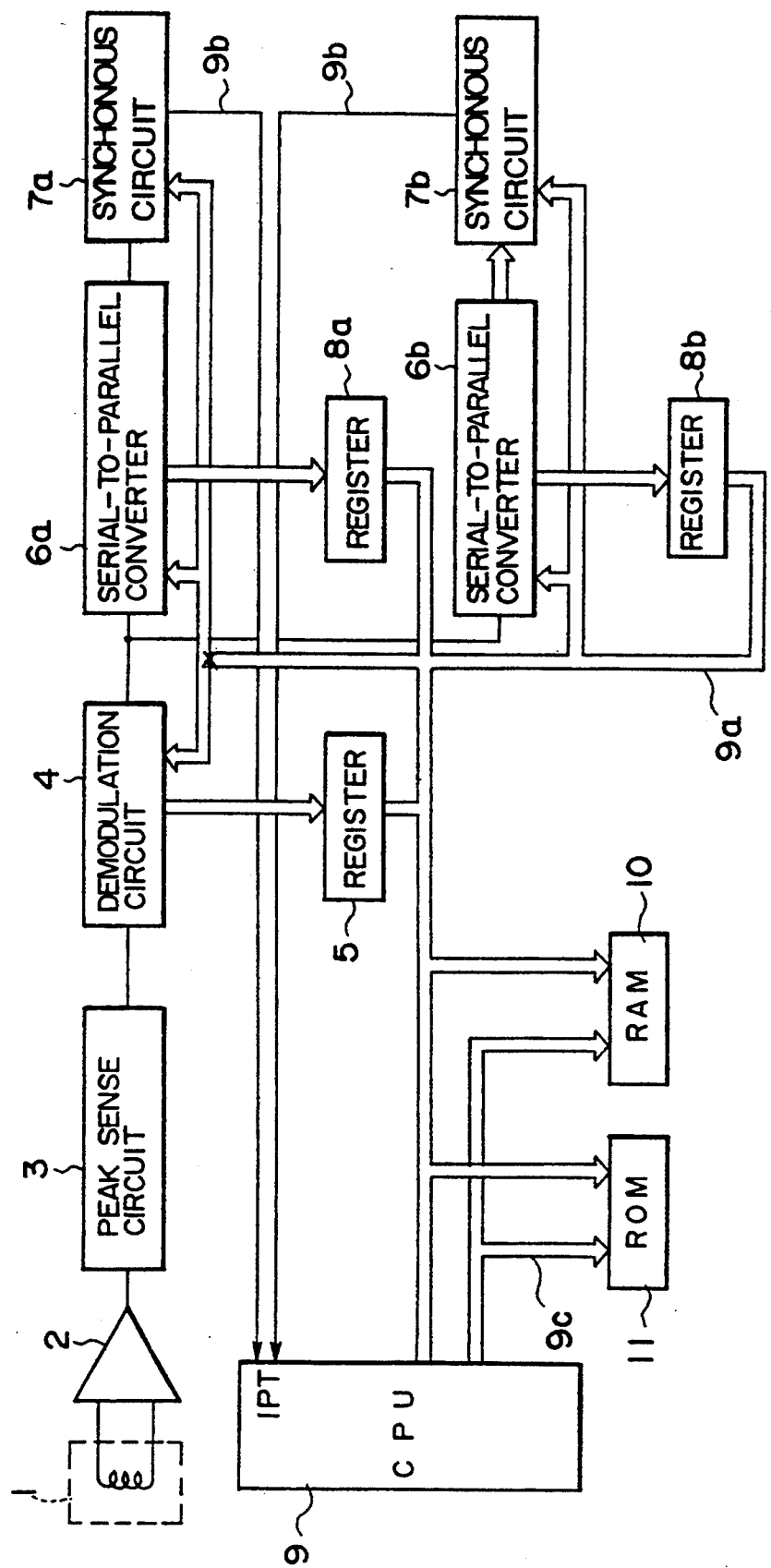
FIG. 1 is a block diagram illustrating a ticket issuing device for magnetized passenger tickets incorporating a magnetic data reader therewith according to an embodiment of the invention.

Referring to FIG. 1 of the drawings, the ticket issuing device for passenger tickets incorporating a magnetic data reader comprises a magnetic read head 1, a differential amplifier circuit 2, a peak sense circuit 3, a demodulation circuit 4, a register 5, two serial-to-parallel converter 6a and 6b, two synchronous circuits 7a and 7b, two registers 8a and 8b, a CPU 9, a RAM 10, and a ROM 11. The magnetic read head 1, the differential amplifier circuit 2, the peak sense circuit 3, and the demodulation circuit 4 are sequentially coupled in this order. The demodulation circuit 4 is further coupled to the register 5 and two serial-to-parallel converters 6a and 6b which are coupled to the synchronous circuits 7a and 7b, and the registers 8a and 8b, respectively. The CPU 9 is coupled to the demodulation circuit 4, the serial-to-parallel converters 6a and 6b, the synchronous circuits 7a and 7b, and the registers 8a and 8b via a data bus 9a which is used for transmitting various data between the CPU 9 and the components thereof. The RAM 10 and the ROM 11 are coupled to the CPU 9 via the data bus 9a and an address bus 9c, through which address data of the RAM 10 and RAM 11 are respectively sent.

The circuit shown in FIG. 1 functions as follows: The magnetic read head 1 reads data which are recorded in a magnetic stripe on a passenger ticket (not shown in FIG. 1) and converts it to electrical signals in an analog form, and the differential amplifier circuit 2 amplifies the output signals from the magnetic read head 1 up to the required level. Then, the peak sense circuit 3 detects peaks (polarity-inverted parts in magnetic data) of the analog signals output from the differential amplifier circuit 2 and converts the analog signals to digital signals having low and high state levels. The demodulation circuit 4 detects shifts of the digital signal from low to high or high to low and converts the digital signals to binary data represented by binary digits. The register 5 stores counter values from an interchange time counter (which is described later) in the demodulation circuit 4 and the sum value from a counter value adder. Two pairs of serial-to-parallel converters 6a and 6b further convert the binary data converted by the demodulation circuit 4, to hexadecimal data represented by hexadecimal digits. The synchronous circuits 7a and 7b (1) compare specified preset binary data with the data read by the magnetic read head 1 and converted to binary data by the demodulation circuit 4, (2) detect the start position of the specified data when both data are matched to each other, and (3) output signals. The registers 8a and 8b store hexadecimal data converted by the serial-to-parallel converters 6a and 6b. The CPU 9 controls the entire device. The synchronous circuits 7a and 7b output signals to the CPU 9 via a signal line 9b. The RAM converts and stores the hexadecimal data in the registers 8a and 8b to character data having a specified length. The ROM contains a control program for the CPU 9.

Figure 2:
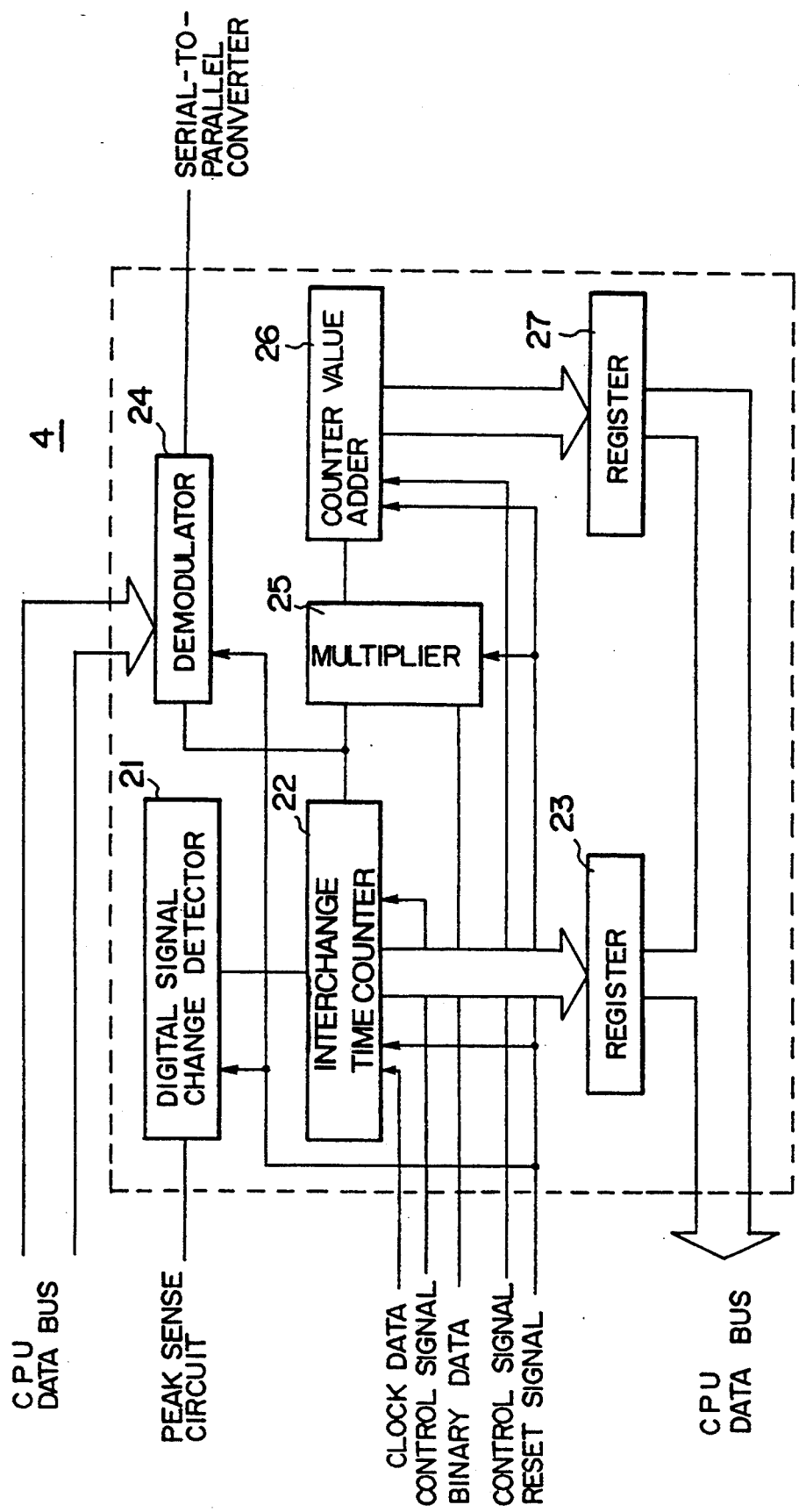
FIG. 2 is a block diagram illustrating a detailed demodulation circuit according to the embodiment of the invention.

Referring to FIG. 2, the demodulation circuit 4 comprises a digital signal change detector 21, an interchange time counter 22, a register 23, a demodulator 24, a multiplier 25, a counter value adder 26, and a register 27. The interchange time counter 22 is coupled to the digital signal change detector 21, and a register 23 is coupled to the CPU 9 via the register 5 and the data bus 9a. The register 27 is also coupled to the CPU 9 via the register 5 and the data bus 9a.

The circuit shown in FIG. 2 functions as follows: The digital signal change detector 21 detects changes from low to high or high to low of the digital signals from the peak sense circuit 3. The interchange time counter 22 acquires a pulse width of the digital signal by counting the period of time between two states detected by the digital signal interchange detector 21 and compares the interchange time with the reference pulse width, based upon clock data (CLK) and control signals received from the CPU 9. The register 23 stores counter values from the interchange time counter 22. The CPU 9 can read counter values in the interchange time counter 22 via register 23. The demodulator 24 converts output from the interchange time counter 22 into binary data and sends it to the serial-to-parallel converters 6a and 6b. The multiplier 25 determines the reference pulse width based upon: the average pulse width of a plurality of bits of the digital signals, on the basis of the output from the interchange time counter 22, and outputs a value equal to a twofold counter value of the interchange time counter 22 for binary data "1" or equal to the counter value for binary data "0". This is because the pulse width for binary data "0" is not identical with that for binary data "1" in the frequency modulation technique, and the reference pulse width equals a twofold counter value output for binary data "1" (the counter value output for binary "0"). The counter value adder 26 sums up counter values by a plurality of bits to calculate the reference pulse width; it acquires the sum of the counter values output from the interchange time counter 22 and doubled for binary data "1" by the multiplier 25 or output without change for binary data "0", based upon the control signal received from the CPU 9. The register 27 stores the counter values summed up by the counter value adder 26. The CPU 9 can read the value calculated by the counter value adder 26 via the register 27 and the register 5. In addition, the CPU 9 can reset the demodulation circuit 4 and control each counter.

Figure 3:
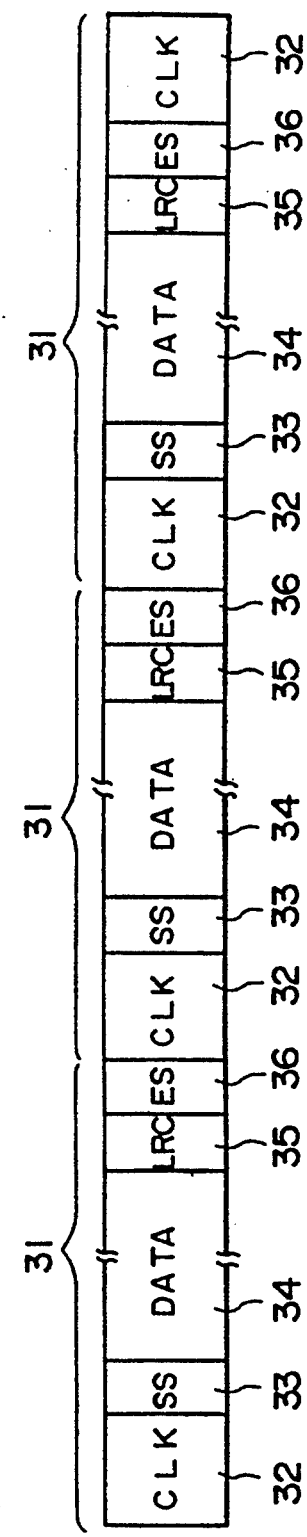
FIG. 3 is a diagram illustrating an example of a magnetic data format of each magnetic stripe formed on passenger tickets.

Referring to FIG. 3, the magnetic data consist of a plurality of blocks 31. A clock data part 32, which is put at the beginning of the block 31 or the end of the magnetic data, contains clock data (CLK) which indicate the existence of the magnetic data. The clock data part 32 contains magnetic data (clock data), consisting of a specific number of successive consecutive "0" s when the digital signals are converted to binary data, to indicate the beginning of the magnetic data. A start sentinel data part 33 contains the start sentinel data (SS) for indicating the start position of a data part. A passenger data part 34 contains various passenger information (DATA). A check data part 35 contains check data (LRC) for checking data normally read from the passenger data part 34. An end sentinel data part 36 contains end sentinel data (ES) indicating the end position of the passenger data part 34.

A process of converting magnetic data into binary data according to the first embodiment of the invention will be described hereinafter in detail.

Figure 4:
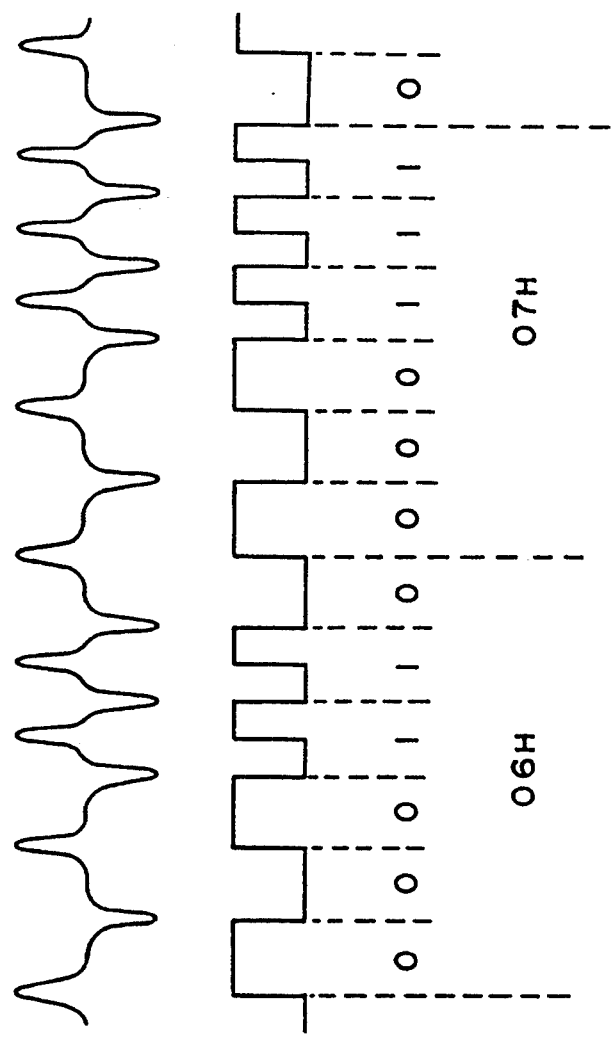
FIG. 4 is a timing chart illustrating a conversion process of magnetic data into binary data using the frequency modulation technique.

Referring to FIG. 4, the magnetic read head 1 converts the magnetic data into electrical signals, which are written into a magnetic stripe on a passenger ticket, and the differential amplifier circuit 2 amplifies it up to the required level. Then, the analog waveforms (a) shown in FIG. 4 are output from the differential amplifier circuit 2.

Next, the peak sense circuit 3 detects the polarity-inverted parts i.e. the peaks of the analog waveforms (a) in FIG. 4, of the electrical signals amplified by the differential amplifier circuit 2, and the signals are converted to digital signals having low and high state levels. Then, the digital waveforms (b) in FIG. 4 are output from the peak sense circuit 3.

The demodulation circuit 4 further converts the digital signals converted by the peak sense circuit 3 into binary data "0" or "1". Since the frequency modulation (FM) technique has been adopted in the described embodiments of the invention, the binary data will be determined based on the frequency of the digital signals. The frequency F assigned to binary "0" is defined as a reference frequency, and the frequency 2F assigned to binary "1" is equal to twice F as shown by binary data (c) in FIG. 4.

All of the binary data, including the clock data converted by the demodulation circuit 4, are further converted to hexadecimal data by the serial-to-parallel converter 6a. The bit length of the hexadecimal data depends on each format of the passenger tickets. One character, however, is assumed to be 6 bits in length in the embodiment of the invention. The hexadecimal data are output as shown at (d) in FIG. 4.

The synchronous circuit 7a detects the start position of the data part 34, and distinguishes the clock data part 32 and the start sentinel data part 33 from the data part 34 which contains various passenger information. When the start position is detected by the synchronous circuit 7a, the CPU 9 generates an interruption signal to indicate it.

After the start position is detected, the hexadecimal data converted by the CPU 9 are initially read in the register 8a and then stored as character data in the RAM 10 via the data bus 9a.

For the benefit of easy understanding of the invention, an explanation will be made of how a reading error is treated, referring to FIG. 5.

Figure 5:
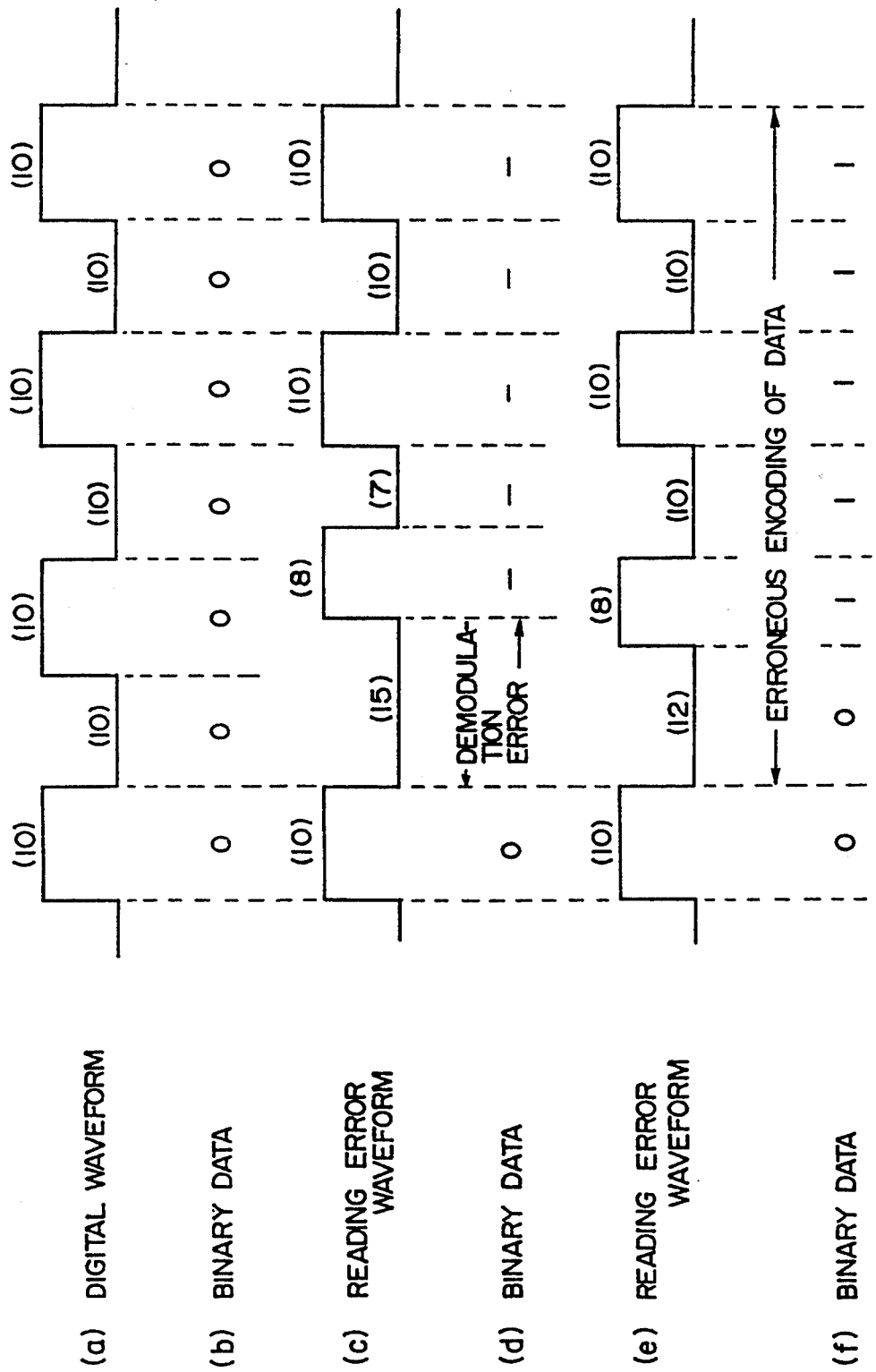
FIG. 5 is a timing chart illustrating a conversion process of magnetic data into binary data when a reading error occurs.

Assuming a digital waveform having, for example, a period length of 10 as shown by waveform (a) in FIG. 5, is achieved from the peak sense circuit 3 by encoding the clock data of the magnetic stripe, the demodulation circuit 4 provides the converted binary data (b) shown in FIG. 5, all "0"s corresponding to each of the pulse period having length 10. This is a normal and correct encoding operation.

However, if some pulse lengths fluctuate due to a reading error in a manner as shown by the waveform (c) in FIG. 5, and the permissible fluctuation range is set within 25% of just the previous one-bit pulse length, the demodulation circuit 4 determines that a demodulation error occurs at the second pulse having period length 15 because the length of the second pulse exceeds the permissible range, that is, 10±2.5 as shown by the binary data (d) in FIG. 5. In this case, a demodulation operation is immediately ceased and restarted as a new demodulation operation.

Accordingly, the present invention is not applied to the above case. On the contrary, when the digital waveform (a) shown in FIG. 5 fluctuates, due to a reading error, in a manner as shown by the waveform (e) in FIG. 5, where each of the pulse lengths is within the permissible range for "0", the demodulation circuit converts them, without detecting a demodulation error, into binary data (f) as shown in FIG. 5.

The second bit pulse having length 12 is converted into "0" when a determination is made whether or not it falls into a permissible range, that is, 10±2.5, of just the previous one-bit pulse having length 10.

The third bit pulse having length 8 is converted into "1" when a determination is made whether or not it falls into a permissible range, that is, 12±3 (25%), of just the previous one-bit pulse having length 12. This is because the length of the third pulse does not fall into the permissible range 12±3 for "0" so that it is considered not "0" but "1".

The fourth bit pulse is converted into "1" based on the third having length 8. This is because the length 10 of the fourth pulse falls in a permissible range 8±2 for "1" so that it is considered "1".

In this manner, all the remaining pulses having length 10 are converted into "1"s instead of "0"s despite having the same pulse lengths as those of the original correct ones. This case is called an "erroneous encoding" and distinguished from the former reading error called a "demodulation error".

The present invention is applied under the circumstances that cause the erroneous encoding of data without detecting a demodulation error.

As for the operation of the demodulation circuit 4, the digital signal interchange detector 21 detects changes between two states of the digital signals from the peak sense circuit 3 and counts the time (a pulse width) between two states of the digital signals detected by the digital signal interchange detector 21. Then, the register 23 stores the counter values counted by the interchange time counter 22. The CPU 9 can read the counter values stored in the register 23.

The magnetic data written into a magnetic stripe consists of binary "0"s and binary "1"s only. Which binary data are set depends on a period of time (a pulse width) of the digital signal. The period of time of the digital signal also depends on the transmission speed of the data medium. Accordingly, the reference time T of the digital signals can be expressed as follows:

$$T = (1/N)/D \tag{1}$$

where V is the transmission speed and D is the recording density of magnetic data.

If a pulse width Tw and a frequency F are assigned to binary "0", Tw/2 and 2F are respectively assigned to binary "1".

Assuming tw is a pulse width of the digital signal converted from the magnetic data, the interchange time counter 22 considers the data to be binary "0" if tw approximates Tw and to be binary "1" if tw approximates Tw/2, based upon the control signal received from the CPU 9. As a result, demodulator 24 outputs either "0" or "1".

As described above, the magnetic data format for the magnetic stripe begins with clock data consisting of a prescribed number of "0"s set for synchronization of data and follows with the start sentinel data. The synchronous circuit 7a detects the beginning of data by comparing both the clock data and the defined start sentinel data with those stored in a digital comparator circuit (which is not shown in FIG. 1). When both stored and read data are matched with each other, the passenger data are started to be read because the synchronization is assumed to be successful.

If binary data in the clock data part are changed from "0" to "1" without detection of a demodulation error by the demodulation circuit 4, in the first embodiment, the CPU 9 controls the counter value adder 26 to sum up values of the pulse widths of the digital signal for a specific number (N) of bits arbitrarily selected from among the clock data in the clock data part 32 which are put at the start position of the magnetic data written into a magnetic stripe on a passenger ticket, reads the sum via the register 27, and then averages the value to calculate a new value for the reference pulse width Tw (time T).

If the pulse width (time) tw of the digital signals of the magnetic data read from the stripe satisfies an expression (2) below in comparison with the calculated reference pulse width Tw (time T), the read data is considered to be binary "0". If it satisfies an expression (3) below, the read data is considered to be binary "1".

$$Tw - \beta < tw < Tw + \beta \tag{2}$$

$$Tw/2 - \beta' < tw < Tw/2 + \beta' \qquad (3)$$

If the pulse width tw of the read data satisfies neither the expression (2) nor the expression (3), the CPU 9 considers that there has occurred an erroneous encoding of data instead of a detection of a demodulation error, and resets the demodulation circuit 4 to restart the demodulation for the whole of the data parts. Values $\beta$ and $\beta'$ indicate arbitrarily set permissible ranges. For example, ±25% is applied to the permissible range for the reference time Tw or Tw/2.

If the above-mentioned first embodiment is applied to the binary data (f) shown in FIG. 5 obtained from the reading error waveform (e) shown in FIG. 5, where the calculated reference pulse width Tw is assumed to be the average value of summed up values of the seven pulse widths having lengths 10, 12, 8, 10, 10, 10, 10, that is, 10, then the reading error waveform (e) shown in FIG. 5 is converted into all "0" s which are original correct data. Accordingly, an error correction is made prior to a resetting of the demodulation circuit 4.

A second embodiment of the invention is now described.

If binary data in the clock data part change from "0" to "1" without detection of a demodulation error by the demodulation circuit 4, in the second embodiment, the CPU 9 controls the counter value adder 26 to obtain the sum R of the counter values achieved from the pulse width Tw of M units of the magnetic data just before the pulse width tw (n) of the magnetic data whose binary data were changed to "1", based upon an expression (4) shown below:

$$R = \sum_{i=n-M}^{n-1} Tw(i) \qquad (4)$$

where Tw(i) is a reference pulse width used to evaluate "$i^{th}$" clock data pulse.

Supposing that the reference pulse width is the average of the sum R of the pulse width Tw(i) of the previous M units of the magnetic data and tw is an interval of time between two states of the digital signal, the CPU 9 computes in accordance with an expression (5) shown below and considers the data to be binary "0" if tw satisfies the expression (5), or computes in accordance with an expression (6) and considers it to be binary "1" if tw satisfies the expression (6).

$$(R/M) - \beta < tw < (R/M) + \beta \qquad (5)$$

$$(R/M)/2 - \beta' < tw < (R/M)/2 + \beta' \qquad (6)$$

If the pulse width tw of the read digital signal satisfies neither the expression (5) nor the expression (6), the CPU 9 considers there to have occurred an erroneous encoding of data instead of a demodulation error, and resets the demodulation circuit 4 to restart the demodulation for the whole of the data parts. Values $\beta$ and $\beta'$ indicate arbitrarily set permissible ranges. For example, ±25% is applied to the permissible range for the reference pulse width (R/M) or (R/M)/2.

If the second embodiment is applied to the binary data (f) shown in FIG. 5, where the calculated reference pulse width Tw(=R/M) is assumed to be the average of summed up values of two pulse widths having length 10, 12, prior to the changed data, then the reading error waveform (e) shown in FIG. 5 is converted into all "0" s which are original correct data. Accordingly, an error correction is made prior to a resetting of the demodulation circuit 4.

In the third embodiment, the clock data normally consists of a prescribed number of "0" s, and the CPU 9 stores the normal clock data "0" s and the start sentinel data as synchronous data in the synchronous circuit 7a. In the synchronous circuit 7b, clock data "1" s are stored as synchronous data on the assumption that normal clock data "0's" are erroneously encoded "1". The data length of the synchronous data is to be set with a length which does not really exist in the passenger data part 34. No start sentinel data are stored in the synchronous circuit 7b. The number of synchronous data "1" s to be set in the synchronous circuit 7b is smaller than the prescribed number of the clock data "0"s. This is to make it possible to reset the demodulation circuit 4 and to restart the demodulation even if an error is detected.

The synchronous circuits 7a and 7b, each having the above synchronous data, am started at a time simultaneously with data reading started from each block 31 on the magnetic stripe. When the clock data are normally read, only "0"s are considered to be present in the clock data, so that when the synchronization is started in the synchronous circuit 7a in which of the synchronous data corresponding to clock data and sentinel data, only "0"s are stored as the synchronous data corresponding to the read clock data, a match will be determined and then a synchronization signal is sent from the synchronous circuit 7a to the CPU 9. Accordingly, if the synchronization is started in the synchronous circuit 7a, that is, if the synchronization circuit 7a sends a synchronization signal to the CPU 9, the signal is considered to be normal and data are normally started to be read from the data part 34. If the CPU 9 detects the start of the operation in the synchronous circuit 7b, that is, receives a synchronization signal from the synchronization circuit 7b, it judges that the clock data BIT "0"is erroneously encoded in the demodulation, and then resets the demodulation circuit 4 and restarts the demodulation. The above control processing is performed by the CPU 9.

In the synchronous circuit 7b, the number of the units of the clock data is set smaller than the prescribed number of the clock data "0"s as described above. The clock data area can be determined as to whether each block data is completed to be read but not completed to perform the synchronization of the subsequent block data.

In other words, the clock data area is assumed to be constituted of a first prescribed number of successive "0"s and when the erroneous encoding of data occurs, the converted "1" will continue with a second prescribed number not exceeding the first prescribed number.

Accordingly, when the read data are recognized to have a prescribed number of successive "0"s, then the data can be determined as the clock data. Otherwise, they can be determined as not the clock data.

Although the error correction is made prior to resetting the demodulation circuit 4 in the first and the second embodiments, no error correction is made in the third embodiment.

If the third embodiment is applied to the binary data (f) shown in FIG. 5, where five consecutive "1"s are set in the synchronous circuit 7b as the synchronous data, then the CPU 9 detects the start of the operation in the synchronous circuit 7b without any error correction. Further, in the third embodiment, the multiplier 25, the counter value adder 26 and the register 27 are not used.

In the fourth embodiment, if a binary data change occurs without detection of a demodulation error in the demodulation of the clock data part, for example, if binary "1" is detected in the clock data area even though the clock data have been stored as binary "0", the CPU 9 detects the pulse width of the digital signals for one bit each before and after the clock data from the interchange time counter 22 via the register 23.

Supposing that tw(n) is a pulse width of the magnetic data unit whose binary value is changed, tw(n−1) is a pulse width of the magnetic data unit just before the change, and tw(n+1) is a pulse width of the magnetic data unit just after the change, the CPU 9 judges by computing whether or not an expression (7) below is satisfied.

$$(3tw(n-1)/2)-\alpha < tw(n)+tw(n+1) < 2tw(n-1)+\alpha \quad (7)$$

If the expression (7) is not satisfied, the CPU 9 considers it as an occurrence of erroneous encoding of data, and resets the demodulation circuit 4 to restart the demodulation.

In this expression, a value $\alpha$ indicates a permissible range of the reference pulse width tw(n−1) used for acquiring binary data; for example, 25% is applied to the permissible range for the reference pulse width.

If the fourth embodiment is applied to the binary data (f) shown in FIG. 5, where the reference pulse width tw(n−1) is a pulse having length 12, then the expression (7) is satisfied. Accordingly, similarly to the first and the second embodiments, the demodulation circuit 4 is not reset to restart the whole data demodulation, but the error correction is made.

In each embodiment described above, the description is given for a magnetic stripe having only one track. It is, however, also applied to a magnetic stripe having a plurality of tracks.

In addition, it covers not only ticket issuing devices for passenger tickets but also devices treating magnetic media such as magnetic stripes.

What is claimed is:

1. A magnetic data reader comprising:
    (a) a magnetic read head for reading data from a magnetic stripe in which binary clock data, binary start sentinel data and further binary data are consecutively magnetically stored in the named order at a portion of a magnetic data format, the magnetically stored binary clock data consisting of a first prescribed number of units of binary clock data of uniform value;
    (b) converter means for converting the clock data and said binary stat sentinel data read from the stripe into a digital signal that alternates between two states;
    (c) calculation means for calculating intervals of time between successive changes in state of the digital signal;
    (d) demodulation means for demodulating the digital signal into converted data including converted binary clock data and converted binary start sentinel data;
    (e) two comparing means, each for comparing the converted data with respective prescribed comparison data to detect a match between the compared data,
    one of said two comparing means containing a first series of comparison data, said one of said two comparing means comparing the first series of comparison date with the converted data,
    the other comparing means containing a second series of comparison data formed of a second prescribed number of binary units of comparison data opposite in value to the binary clock data stored on the magnetic stripe, said other comparing means comparing the second series of comparison data to the converted binary clock data; and
    (f) control means for restarting a demodulation operation by resetting the demodulation means when the other comparing means detects a match.

2. A data reader set forth in claim 1, wherein the magnetic binary clock data stored for the magnetic stripe are consecutive binary "0"s.

3. A magnetic data reader set forth in claim 1, wherein the demodulation means performs frequency demodulation on the converted binary clock data and the converted Start sentinel data to acquire the digital signal.

4. A magnetic data reader as set forth in claim 1, wherein the second prescribed number is less than the first prescribed number.

5. A magnetic data reader as set forth in claim 1, wherein the first series of comparison data includes a plurality of successive data units identical in value to the value of the binary clock data stored on the magnetic stripe.

6. A magnetic data reader as set forth in claim 1, wherein a detection of a match by said one of said two comparing means is indicative of an absence of error in the converted data.

7. A method of reading magnetic data, comprising the steps of:
    (a) reading data from a magnetic stripe in which magnetic binary clock data, binary start sentinel data and further binary data are consecutively magnetically stored in the named order at a portion of a magnetic data format, the magnetically stored binary clock data consisting of a first prescribed number of units of binary clock data of uniform value;
    (b) converting the clock data and start sentinel data read from the stripe into a digital signal that alternates between two states;
    (c) calculating intervals of time between successive changes in state of the digital signal;
    (d) demodulating the digital signal into converted data including converted binary clock data and converted binary start sentinel data;
    (e) comparing the converted binary clock data and the converted binary start sentinel data with a first series of comparison data to detect a match between the compared data indicative of an absence of error in the converted data;
    (f) in parallel with said step (e), comparing the converted binary clock data with a second series Of comparison data formed of a second prescribed number of binary units of comparison data opposite in value to the binary clock data stored on the magnetic stripe to detect a match between the compared data; and
    (g) restarting a demodulation operation when a match is detected in said step (f).

8. A method as set forth in claim 7, wherein the binary clock data stored on the magnetic stripe are consecutive binary "0"s.

9. A method as set forth in claim 7, wherein said step (d) includes the step of frequency demodulating the digital signal to acquire the converted binary clock data and converted binary sentinel data.

10. A method of reading magnetic data as set forth in claim 7, wherein the second prescribed number is less than the first prescribed number.

11. A method of reading magnetic data as set forth in claim 7, wherein the first series of comparison data includes a plurality of successive data units identical in value to the value of the binary clock data stored on the magnetic stripe.

12. A method of reading magnetic data as set forth in claim 7, further comprising the step of reading the further data if a match is detected in said step (e).

13. A magnetic data reader comprising:
   (a) a magnetic read head for reading data from a magnetic stripe in which binary clock data of uniform value, binary start sentinel data and further binary data, consecutively magnetically stored in the named order at a portion of a magnetic data format, the magnetically stored binary clock data including a first prescribed number of units of binary clock data;
   (b) converter means for converting the clock data and start sentinel data read from the stripe into a digital signal that alternates between two states;
   (c) calculation means for calculating intervals of time between successive changes in state of the digital signal;
   (d) demodulation means for demodulating the digital signal into converted data including converted binary clock data and converted binary start sentinel data;
   (e) two comparing means, each for comparing the converted data with respective prescribed comparison data to detect a match between the compared data,
   one of said two comparing means comparing the converted binary clock data and the converted binary start sentinel data to a first series of comparison data so as to detect an end of the converted binary start sentinel data, and
   the other comparing means comparing the converted binary clock data to a second series of comparison data formed of a second prescribed number of binary units of comparison data opposite in value to the binary clock data stored on the magnetic stripe; and
   (f) control means for restarting a demodulation operation by resetting the demodulation means when the other comparing means detects a match.

14. A magnetic data reader as set forth in claim 13, wherein the second prescribed number is less than the first prescribed number, and wherein the first series of comparison data includes a plurality of successive data units identical in value to the value of the binary clock data stored on the magnetic stripe.

15. A method of reading magnetic data, comprising the steps of:
   (a) reading data from a magnetic stripe in which magnetic binary clock data of uniform value, binary start sentinel data and further binary data are consecutively magnetically stored in the named order at a portion of a magnetic data format, the magnetically stored binary clock data including a first prescribed number of units of binary clock data;
   (b) converting the clock data and start sentinel data read from the stripe into a digital signal that alternates between two states;
   (c) calculating intervals of time between successive changes in state of the digital signal;
   (d) demodulating the digital signal into converted data including converted binary clock data and converted binary start sentinel data;
   (e) comparing the converted data with a first series of comparison data;
   (f) in parallel with said step (e), comparing the converted binary clock data with a second series of comparison data formed of a second prescribed number of binary units of comparison data opposite in value to the binary clock data stored on the magnetic stripe, to detect a match between the compared data; and
   (g) restarting a demodulation operation when a match is detected in said step (f).

16. A method of reading magnetic data as set forth in claim 15, wherein said step (e) includes the step of detecting a match between the first series of comparision data and the converted data, further comprising the step of reading the further data from the magnetic stripe when the match is detected in said step (e).

17. A method of reading magnetic data as set forth in claim 15, wherein the second prescribed number is less than the first prescribed number, and wherein the first series of comparison data includes a plurality of successive binary units identical in value to that of the units of binary clock data stored on the magnetic stripe.

* * * * *